(12) United States Patent
Park et al.

(10) Patent No.: US 11,657,374 B2
(45) Date of Patent: May 23, 2023

(54) IN-VEHICLE PAYMENT SYSTEM AND METHOD

(71) Applicants: HYUNDAI MOTOR COMPANY, Seoul (KR); KIA MOTORS CORPORATION, Seoul (KR)

(72) Inventors: Min Gu Park, Pocheon-si (KR); Jae Hoon Chung, Daegu (KR); Ji Heon Kim, Gyeongsan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 431 days.

(21) Appl. No.: 16/800,845

(22) Filed: Feb. 25, 2020

(65) Prior Publication Data

US 2021/0081912 A1  Mar. 18, 2021

(30) Foreign Application Priority Data

Sep. 18, 2019  (KR) .......................... 10-2019-0114881

(51) Int. Cl.
*G06Q 20/08* (2012.01)
*H04W 4/40* (2018.01)
*G06Q 20/10* (2012.01)
*H04W 4/021* (2018.01)
*H04W 4/80* (2018.01)

(52) U.S. Cl.
CPC ......... *G06Q 20/085* (2013.01); *G06Q 20/108* (2013.01); *H04W 4/021* (2013.01); *H04W 4/40* (2018.02); *G06Q 2240/00* (2013.01); *H04W 4/80* (2018.02)

(58) Field of Classification Search
CPC ............... G06Q 20/085; G06Q 20/108; G06Q 2240/00; H04W 4/40; H04W 4/021; H04W 4/80
See application file for complete search history.

(56) References Cited

U.S. PATENT DOCUMENTS

| | | | | |
|---|---|---|---|---|
| 2009/0024525 A1* | 1/2009 | Blumer | .................. | G06Q 20/10 705/41 |
| 2010/0017118 A1* | 1/2010 | Dougherty | ............. | G08G 1/143 701/533 |
| 2010/0280956 A1* | 11/2010 | Chutorash | ............. | G07F 13/025 705/64 |
| 2011/0136429 A1* | 6/2011 | Ames | ....................... | H04B 5/02 235/382 |
| 2015/0168172 A1* | 6/2015 | Roth | .................. | G01C 21/3679 701/123 |

(Continued)

FOREIGN PATENT DOCUMENTS

KR    2017-0124519 A    11/2017

*Primary Examiner* — Chris Parry
*Assistant Examiner* — Hassan A Khan
(74) *Attorney, Agent, or Firm* — Morgan, Lewis & Bockius LLP

(57) ABSTRACT

In-vehicle payment system and method are provided. The in-vehicle payment system includes a first communication device configured to communicate with a payment terminal, a payment device configured to providing payment form information, and a body controller configured to, when receiving payment information from the payment terminal, perform payment processing in association with the payment terminal using the payment form information.

14 Claims, 8 Drawing Sheets

(56) References Cited

U.S. PATENT DOCUMENTS

| | | | |
|---|---|---|---|
| 2015/0199685 A1* | 7/2015 | Betancourt | G06Q 20/40 |
| | | | 705/44 |
| 2015/0206181 A1* | 7/2015 | Parundekar | G06Q 30/0261 |
| | | | 705/14.49 |
| 2015/0220916 A1* | 8/2015 | Prakash | G07B 15/063 |
| | | | 705/41 |
| 2016/0180395 A1* | 6/2016 | Rai | G07C 5/006 |
| | | | 701/1 |
| 2017/0148061 A1* | 5/2017 | Lei | H04W 76/40 |
| 2017/0293910 A1* | 10/2017 | Tinskey | G06Q 20/40145 |
| 2017/0323565 A1* | 11/2017 | Nordbruch | G01C 21/3685 |
| 2018/0106654 A1* | 4/2018 | Kim | G05D 1/0011 |
| 2020/0020022 A1* | 1/2020 | Friedman | G06Q 20/382 |
| 2020/0326732 A1* | 10/2020 | Ghannam | G07C 5/0825 |
| 2020/0387840 A1* | 12/2020 | Noguchi | G06Q 10/02 |
| 2021/0081912 A1* | 3/2021 | Park | H04W 4/021 |

* cited by examiner

IN-VEHICLE PAYMENT SYSTEM AND METHOD

CROSS-REFERENCE TO RELATED APPLICATION

The present application claims priority to and the benefit of Korean Patent Application No. 10-2019-0114881, filed on Sep. 18, 2019, which is incorporated herein by reference in its entirety.

TECHNICAL FIELD

The present disclosure relates to in-vehicle payment system and method.

BACKGROUND

The statements in this section merely provide background information related to the present disclosure and may not constitute prior art.

As a vehicle information technology (IT) is developed, a vehicle is not only means of transportation, but also provides various functions for convenience of a user. For example, there is a digital key system that supports functions such as getting on/off of the vehicle (i.e., door lock and unlock), start-up, and the like using a mobile device such as a smart phone, a wearable device, an electronic key (FOB), or the like. The digital key system performs digital key authentication using ultra wide band (UWB) communication. A digital key may be downloaded on the mobile device in a form of an application (app) and used.

In addition, electronic commerce functions such as paying a refueling cost through a navigation, an AVN (Audio Video Navigation), and the like mounted on the vehicle or through accessing Internet have been applied. When there is a need for paying while driving, for example, when refueling at a gas station, when paying a parking fee when leaving a parking lot, or when purchasing an item at a drive-through store, a driver has to find payment means (e.g., a check card, cash, or the like) in a wallet, a bag, or the like, and pay while in the vehicle or after getting off the vehicle, so that prompt payment is difficult.

Further, when the driver prepares the payment means for the prompt payment when paying in the vehicle, driver's attention may be distracted and a safety problem may occur.

SUMMARY

An aspect of the present disclosure provides in-vehicle payment system and method that perform secure and prompt payment utilizing ultra wide band (UWB) communication.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-vehicle payment system includes a first communication device for performing secure communication with a payment terminal, a payment device for providing payment means information, and a body controller that, when receiving payment information from the payment terminal, performs payment processing in association with the payment terminal using the payment means information.

In one form of the present disclosure, the first communication device may use ultra wide band (UWB) communication as the secure communication.

In one form of the present disclosure, the first communication device may use at least one of Bluetooth, near field communication (NFC), or low frequency (LF) communication.

In one form of the present disclosure, the body controller may measure a vehicle position via the secure communication, and output the payment information to a user interface when an error between the vehicle position and a specified position is within a tolerance range.

In one form of the present disclosure, the specified position may be one of a refueling available position, a parking available position, and a position for receiving an ordered item.

In one form of the present disclosure, the body controller may perform advance payment processing in association with the payment terminal using the payment means information when the error between the vehicle position and the specified position is out of the tolerance range, and within a secure communication available range.

In one form of the present disclosure, the in-vehicle payment system may further include a second communication device for performing wireless communication with a mobile terminal.

In one form of the present disclosure, the body controller may obtain the payment means information from the mobile terminal via the second communication device.

In one form of the present disclosure, the body controller may perform the payment processing at a time point when at least one of refueling completion, leaving of a parking lot, or receiving an ordered item is satisfied.

In one form of the present disclosure, the body controller may receive a parking fee table and absolute position information of the payment terminal from the payment terminal to calculate an expected parking fee and a parking position.

In one form of the present disclosure, the body controller may transmit the expected parking fee and the parking position to a mobile terminal matching the vehicle.

According to another aspect of the present disclosure, an in-vehicle payment method includes receiving, by a body controller, payment information from a payment terminal based on secure communication, obtaining, by the body controller, payment means information, and performing, by the body controller, payment processing using the payment means information in association with the payment terminal.

In one form of the present disclosure, the secure communication may be implemented as ultra wide band (UWB) communication.

In one form of the present disclosure, the method may further include, after the receiving of the payment information, measuring, by the body controller, a vehicle position via the secure communication, and outputting the payment information to a user interface when an error between the vehicle position and a specified position is within a tolerance range.

In one form of the present disclosure, the specified position may be one of a refueling available position, a parking available position, and a position for receiving an ordered item.

In one form of the present disclosure, the method may further include, after the receiving of the payment information, performing, body controller, advance payment processing in association with the payment terminal using the payment means information when the error between the vehicle position and the specified position is out of the tolerance range, and within a secure communication available range.

In one form of the present disclosure, the obtaining of the payment means information may include obtaining the payment means information from a payment device mounted in a vehicle or a mobile terminal of a passenger in the vehicle.

In one form of the present disclosure, the performing of the payment processing may include performing the payment processing at a time point when at least one of refueling completion, leaving of a parking lot, or receiving an ordered item is satisfied.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
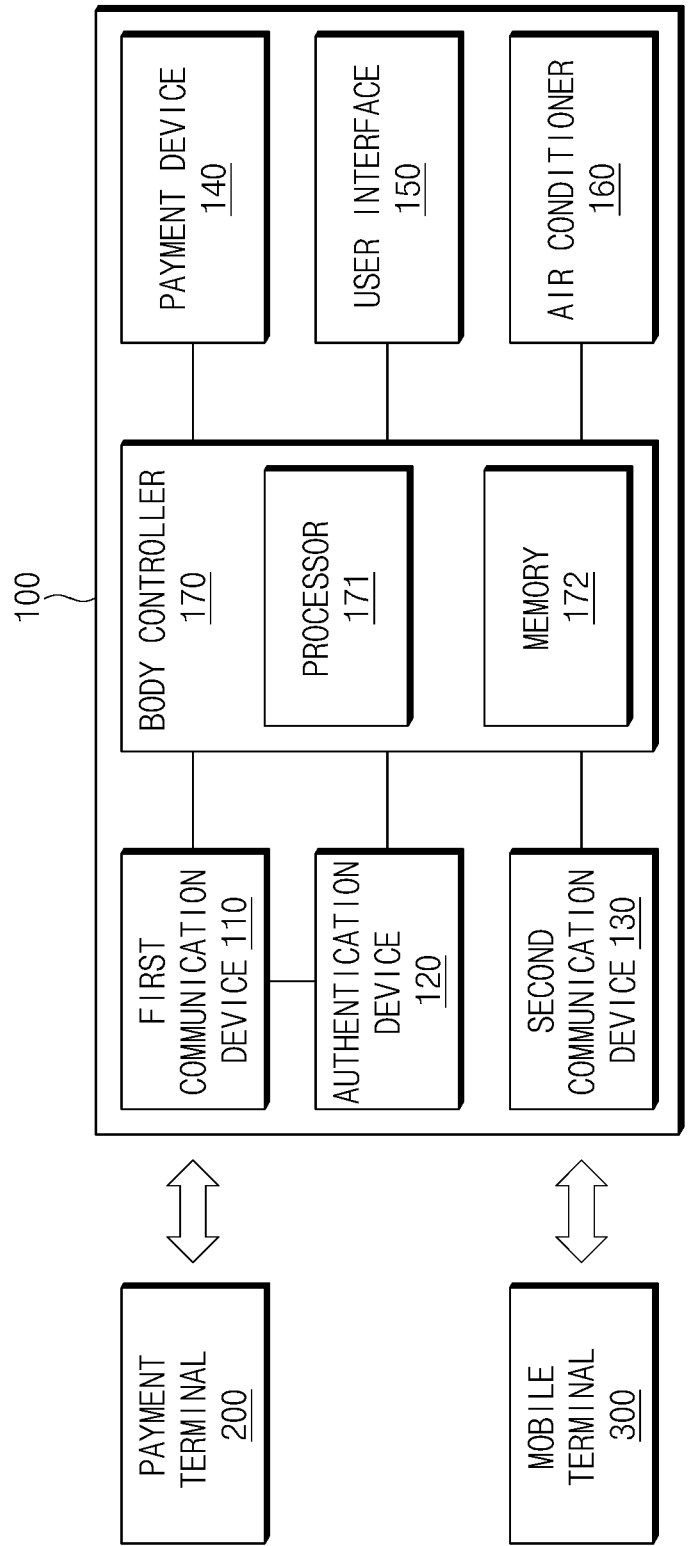
FIG. 1 is a block diagram of an in-vehicle payment system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of the related known configuration or function will be omitted when it is determined that it interferes with the understanding of some forms of the present disclosure.

In describing some forms of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
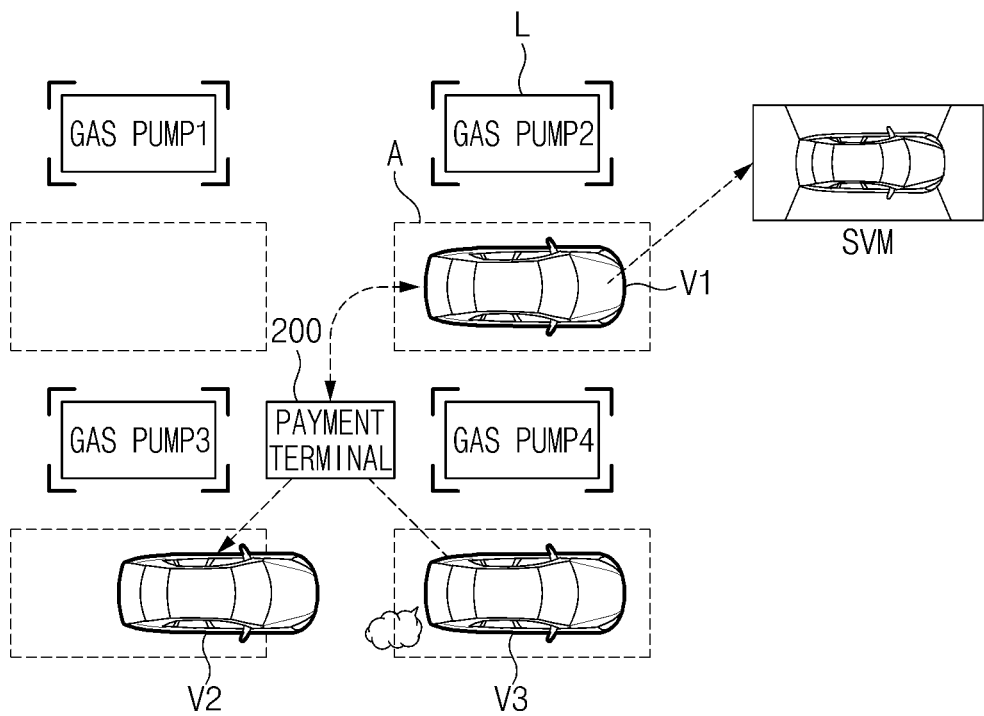
FIG. 2 illustrates an example for illustrating a payment process in one form of the present disclosure.
Figure 3:
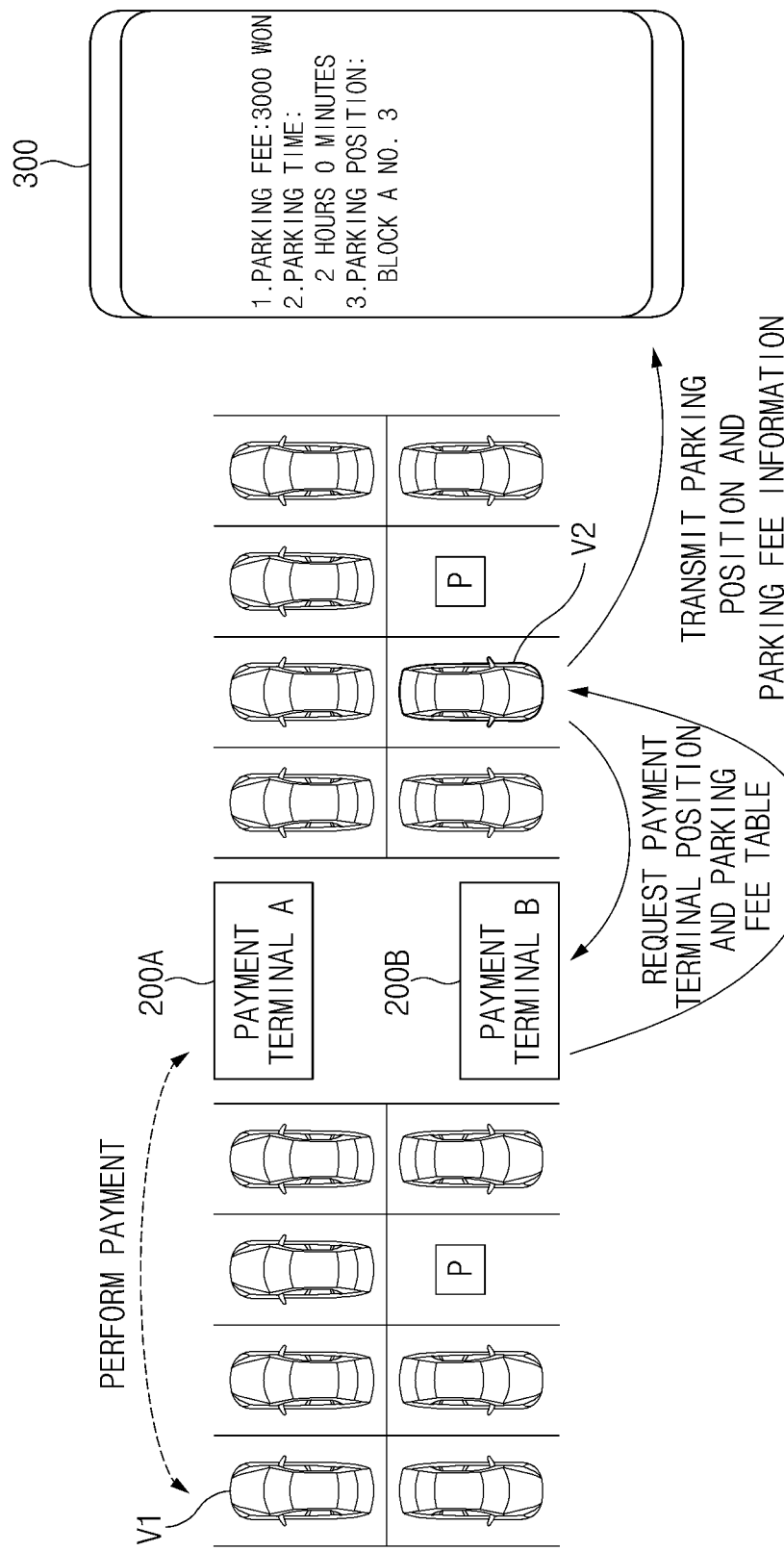
FIG. 3 is another example for illustrating a payment process in one form of the present disclosure.

FIG. 1 is a block diagram of an in-vehicle payment system 100 in some forms of the present disclosure. Further, FIG. 2 illustrates an example for illustrating a payment process in some forms of the present disclosure. Further, FIG. 3 is another example for illustrating a payment process in some forms of the present disclosure.

The in-vehicle payment system 100 shown in FIG. 1 provides a wireless payment service utilizing a digital key system mounted on a vehicle. The wireless payment service of the in-vehicle payment system 100 allows a payer (e.g., a driver or a passenger) in the vehicle to pay for a cost incurred by refueling, parking, ordering an item, or the like without getting off the vehicle.

Such in-vehicle payment system 100 includes a first communication device 110, an authentication device 120, a second communication device 130, a payment device 140, a user interface 150, an air conditioner (air conditioning system) 160, and a body controller 170 connected with each other via an in-vehicle network (IVN). The in-vehicle network may be implemented as at least one of communication technologies such as a controller area network (CAN), a media oriented systems transport (MOST) Network, a local interconnect network (LIN), an X-by-Wire (Flexray), and the like.

The first communication device 110 allows the in-vehicle payment system 100 to perform secure communication with a payment terminal 200. In this connection, the secure communication is a communication technology used for digital key authentication. Ultra wide band (UWB) communication and the like may be used as the secure communication. The UWB communication may be used to measure a position of the vehicle (vehicle position). The payment terminal 200, which is a device capable of wireless and/or wired communication, may be implemented as a point of sales (POS) terminal. Although not shown in the drawings, the payment terminal 200 may include a communication module, a user input module, an output module, a processor, and a memory.

The first communication device 110 performs short-range wireless communication with the payment terminal 200. At least one of communication technologies such as Bluetooth (BLE), low frequency (LF) communication, near field communication (NFC), radio frequency identification (RFID), infrared communication (Infrared Data Association, IrDA), ZigBee, and the like may be used as a short-range communication technology. For example, the first communication device 110 may transmit a UWB communication wakeup request to the payment terminal 200 using the Bluetooth and/or LF communication. In addition, the first communication device 110 may also receive authentication information (e.g., a certificate) transmitted from the payment terminal 200.

The authentication device 120 transmits and receives data (e.g., the certificate) that requires security with the payment terminal 200 or a mobile terminal 300 in which a digital key is stored through the first communication device 110. The authentication device 120 performs identity authentication (hereinafter, ID authentication) of the payment terminal 200 and/or the digital key. When receiving the certificate from the payment terminal 200 or the mobile terminal 300 in which the digital key is stored, the authentication device 120 performs the ID authentication based on the received certificate. The mobile terminal 300, which is a device capable of wireless and/or wired communication, may be implemented as a portable device such as a smartphone, a tablet, a personal digital assistant (PDA), a portable multimedia player (PMP) and/or a laptop computer. Although not shown in the drawings, such mobile terminal 300 may include a communication module, a user input module, an output module, a processor, and a memory.

The second communication device 130 performs short-range wireless communication with the mobile terminal 300 in which payment means information is stored. At least one of communication technologies such as the Bluetooth, LF communication, NFC, UWB, RFID, and the like may be used as the short range wireless communication technology. The second communication device 130 may be implemented as a Wireless Power Consortium (WPC) device that supports the short-range wireless communication.

The payment device 140 is mounted in the vehicle to read information of payment means and transmits the read payment means information to the body controller 170. For example, the payment device 140 may be implemented in a form coupled to a room mirror in the vehicle. In other words, the payment device 140 serves to provide the payment means information. In this connection, the payment means may be a credit card, a cash card, a smart card (app card), and the like, and the payment means information may include a card number, an expiration date, biometric information, a signature, and the like.

The user interface 150 receives data (information) from a user or outputs progress and a result based on an operation of the body controller 170. The user interface 150 may be implemented as an AVN (Audio Video Navigation), a telematics terminal, or the like.

The user interface 150 may include a biometric information input device such as a fingerprint sensor and/or an iris sensor, an input device such as a keyboard, a button and/or a switch, a display device, and the like. The display device may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, and/or a cluster.

The user interface 150 may receive biometric information of the user (e.g., the payer), for example, a fingerprint, an iris, or the like, through the biometric information input device. The user interface 150 transmits the received biometric information of the user to the body controller 170. In addition, the user interface 150 may transmit data generated based on a user operation to the body controller 170. For example, the user interface 150 may obtain a user input such as a specific object (e.g., an item to be purchased and the like) selection information, a fuel amount, or the like through the input device. In addition, the user interface 150 may output payment information, payment approval content, and the like as visual information, auditory information, and/or tactile information.

The air conditioner 160 is a device for controlling temperature, humidity, and/or air flow, and the like in the vehicle. The air conditioner 160 may switch an operation mode to an indoor air mode or to an outdoor air mode based on an instruction of the body controller 170.

The body controller 170 is a device for controlling a smart key, vehicle door opening and closing, a tire air pressure, and the like. The body controller 170 obtains the payment means information from the payment device 140 or the mobile terminal 300 to perform payment processing. The body controller 170 includes a processor 171 and a memory 172.

The processor 171 controls overall operations of the body controller 170. The processor 171 may be implemented as at least one of an application specific integrated circuit (ASIC), a digital signal processor (DSP), a programmable logic device (PLD), a field programmable gate array (FPGA), a central processing unit (CPU), a microcontroller, and/or a microprocessor.

The memory 172 stores software programmed for the processor 171 to perform a predetermined operation. The memory 172 may store payment means registration information, vehicle information, and the like. In this connection, the payment means registration information is information stored in advance based on a predetermined registration procedure, which may include payment means identification information (e.g., card number), payment means expiration date, user authentication information (payer authentication information), and the like. The vehicle information may include a vehicle identification number, fuel type, and the like. The memory 172 may store a digital key authentication program, a user (payer) authentication program, a positioning program, a cost calculation program, and the like. The memory 172 may be implemented as at least one of storage media (recording media) such as a flash memory, a hard disk, a secure digital (SD) Card, a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and the like.

The processor 171 of the body controller 170 measures the vehicle position through the first communication device 110. In other words, the body controller 170 obtains position information (absolute position) of the payment terminal 200 from the payment terminal 200 via the UWB communication. The payment terminal 200 transmits the position information of the payment terminal 200 to the vehicle entering a range (region) capable of the UWB communication. The body controller 170 calculates a relative position (i.e., vehicle position) of the vehicle based on the position of the payment terminal 200. That is, the processor 171 may calculate a distance between the vehicle, that is, the in-vehicle payment system 100 and the payment terminal 200, and estimate the vehicle position based on the calculated distance. The processor 171 may measure the vehicle position (the distance between the vehicle and the payment terminal) using triangulation and/or a time-of-flight technique (ToF).

The processor 171 may calculate an error between the vehicle position and a specified position. In this connection, the designated position may be one of a refueling available position, a parking available position, and an ordered item (purchased item) receiving position. The processor 171 determines whether the error between the vehicle position and the specified position is within a tolerance range. The tolerance range is set in advance by a system designer.

When the error between the vehicle position and the specified position is within the tolerance range, the processor 171 identifies the payment information and performs the payment processing using the payment means information. The processor 171 may obtain the payment information from the payment terminal 200 before or after the vehicle reaches the specified position. The processor 171 outputs the payment information through the user interface 150 when the vehicle reaches the specified position. In other words, the processor 171 outputs the payment information to the user interface 150 when the error between the vehicle position and the specified position is within the tolerance range. The processor 171 displays the payment information on a screen of the user interface 150 and determines a payer to pay a cost included in the payment information. The processor 171 may determine (select) the driver or the passenger as the payer based on a user input, which is input through the user interface 150.

The processor 171 obtains payment means information of the determined payer. The processor 171 determines approval of payment using the payment means information through payer authentication processing. For example, the processor 171 compares the fingerprint information in the payment means registration information stored in advance in the memory 172 with the fingerprint information input through the user interface 150 to determine whether the two fingerprint information are matched with each other. The processor 171 approves the payment using the payment means information when the two fingerprint information match, and disapproves the approval of the payment using the payment means information when the two fingerprint information do not match.

The processor 171 transmits the payment means information to the payment terminal 200 when the payment is approved. The payment terminal 200 performs the payment processing using the payment means information, and transmits the payment approval result to the body controller 170. The processor 171 outputs the payment approval result through the user interface 150 such that the payer may identify the payment approval result.

As shown in FIG. 2, when a first vehicle V1 enters a parking available region "A", the body controller 170 of the first vehicle V1 measures the vehicle position via the secure communication with the payment terminal 200 through the first communication device 110. The body controller 170 of the first vehicle V1 transmits the gas type, an amount of gas to be refueled, and the vehicle position to the payment terminal 200. The payment terminal 200 identifies the vehicle position, and provides the gas type (fuel information) and the amount of the gas to be refueled to a gas pump (fuel dispenser) "L" matching the vehicle position. The payment terminal 200 calculates a refueling cost during refueling or when the refueling is completed, and transmits payment information including the refueling cost, refueled amount, and/or gas price, and the like to the first vehicle V1. The body controller 170 of the first vehicle V1 receives the payment information, and performs the payment processing based on the received payment information.

In addition, the body controller 170 of the first vehicle V1 may use a surround view monitor (SVM) mounted on the vehicle to identify a position of the gas pump "L" to automatically open a gas filling port of the first vehicle V1.

The body controller 170 of a second vehicle V2 determines whether a third vehicle V3 located in front of the second vehicle V2 is refueled via the communication with the payment terminal 200. When the third vehicle V3 has completed the refueling, the body controller 170 of the second vehicle V2 controls the air conditioner 160 to switch the operation mode to the indoor air mode to prevent inflow of smoke resulted by a movement of the third vehicle V3. In this connection, the air conditioner 160 switches to the indoor air mode when the operation mode thereof is the outdoor air mode, and maintains a current operation mode when the operation mode thereof is the indoor air mode.

Referring to FIG. 3, the body controller 170 of the first vehicle V1 may perform parking fee payment in association with a payment terminal "A" 200A via the secure communication in a state of being parked before leaving. Therefore, labor of waiting for the parking fee payment or finding a parking meter for parking fee advance payment may be reduced.

Further, the body controller 170 of the second vehicle V2 may request a payment terminal "B" 200B to provide information, such as payment terminal position information, parking fee table, and the like. The payment terminal "B" 200B transmits absolute position information of the payment terminal B 200B and the parking fee table via the UWB communication to the second vehicle V2. The body controller 170 of the second vehicle V2 calculates an expected parking fee and parking position based on the absolute position and the parking fee table provided from the payment terminal "B" 200B. The body controller 170 of the second vehicle V2 transmits the calculated expected parking fee and parking position information to the mobile terminal 300 that matches the second vehicle V2. The mobile terminal 300 displays the expected parking fee and parking position information on the display screen such that the user may identify the parking fee in real time.

Figure 4:
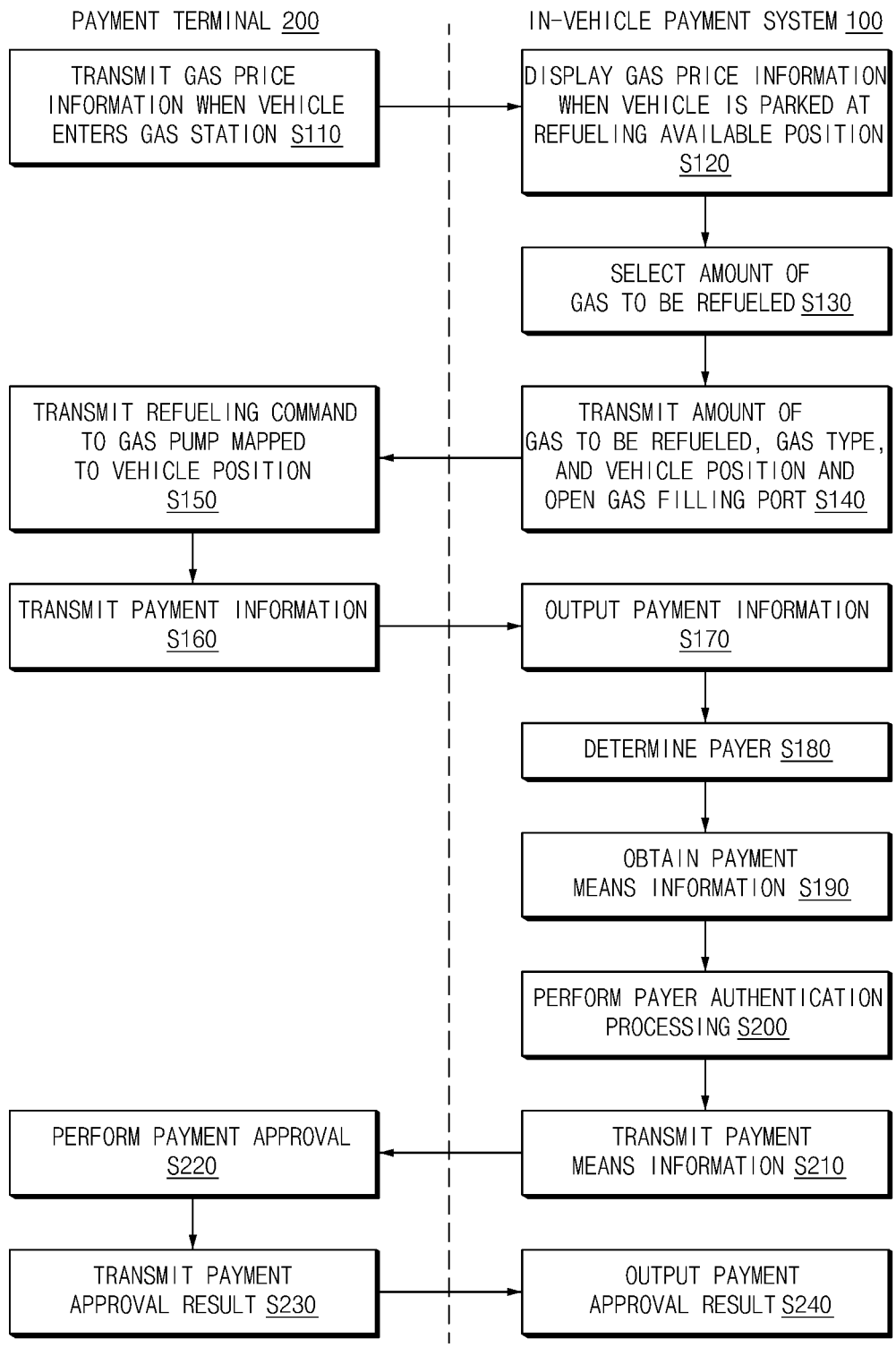
FIG. 4 is a flowchart illustrating an in-vehicle payment method in a first form of the present disclosure.

FIG. 4 is a flowchart illustrating an in-vehicle payment method in some forms of the present disclosure. Some forms of the present disclosure describe a process in which the in-vehicle payment system 100 pays the refueling cost at the gas station.

Referring to FIG. 4, when the vehicle enters the gas station, the payment terminal 200 disposed at the gas station transmits gas price information to the corresponding vehicle (S110). The gas price information includes price per reference unit (e.g., liter) for each gas type. The payment terminal 200 may transmit the absolute position information of the payment terminal 200 together when the gas price information is transmitted.

When the vehicle is parked in a refueling available region, the in-vehicle payment system 100 displays the gas price information received from the payment terminal 200 on the user interface 150 (S120). In this connection, the refueling available region is a position specified in advance (specified position). The body controller 170 of the in-vehicle payment system 100 measures the vehicle position based on the UWB communication. In this connection, the vehicle position refers to a relative position (relative distance) based on the absolute position of the payment terminal 200. The body controller 1700 displays the gas price information on the display of the user interface 150 when the error between the vehicle position and the specified position is within the tolerance range.

The in-vehicle payment system 100 selects the amount of the gas to be refueled based on the user input (S130). The body controller 170 determines the amount of the gas to be refueled based on the user input, which is input through the user interface 150. In this connection, the body controller 170 may determine the refueling cost based on the user input.

When the amount of the gas to be refueled is selected, the in-vehicle payment system 100 transmits the amount of the gas to be refueled, the gas type, and the vehicle position to the payment terminal 200, and opens the gas filling port (S140). The body controller 170 transmits a refueling request message including the amount of the gas to be refueled, the gas type, and the vehicle position to the payment terminal 200.

The payment terminal 200 transmits a refueling command to the gas pump mapped to the vehicle position (S150). The refueling command includes the amount of the gas to be refueled and the gas type information. When receiving the refueling cost from the in-vehicle payment system 100, the payment terminal 200 calculates the amount of the gas to be refueled based on the refueling cost and the gas price information, and provides the calculated amount of the gas to be refueled to the gas pump. The gas pump is to be able to supply only a corresponding gas type based on the refueling command of the payment terminal 200.

The payment terminal 200 calculates the refueling cost based on the amount of the gas to be refueled, the gas type, and the gas price during the refueling, and transmits payment information including the calculated refueling cost (S160). An example in which the payment terminal 200 transmits the payment information to the in-vehicle payment system 100 during the refueling has been described. However, the present disclosure may not be limited thereto, and the payment information may be transmitted at a time of starting the refueling or at a time when the refueling is completed.

When the payment information is received, the in-vehicle payment system 100 outputs the received payment information to the user interface 150 (S170).

The in-vehicle payment system 100 determines the payer (S180). The body controller 170 determines one of the driver and/or the passenger as the payer. In this connection, the body controller 170 may select the payer based on the user input received through the user interface 150.

The in-vehicle payment system 100 obtains the payment means information of the payer (S190). When the payer is a vehicle owner, the body controller 170 obtains the payment means information from the payment device 140. The payment device 140 reads the information of the payment means mounted on the payment device 140 and transmits the read information to the body controller 170. On the other hand, when the payer is the passenger, the body controller 170 obtains the payment means information via communication with the mobile terminal 300 of the payer through the second communication device 130.

The in-vehicle payment system 100 performs the payer authentication processing for the payment means information (S200). The body controller 170 performs the payer authentication processing to verify validity of the payment means information. The payer authentication may be performed using the authentication technology, such as the fingerprint authentication, the iris authentication, or the like. For example, the body controller 170 obtains the fingerprint information of the payer through the user interface 150, compares the obtained fingerprint information with fingerprint information mapped to the pre-registered payment means, and determines that payer authentication is successful when the two fingerprint information match with each other. In one example, when the body controller 170 obtains the payment means information from the mobile terminal 300 of the payer, the mobile terminal 300 performs the payer authentication processing for the payment means information, and then transmits the payment authentication result to the body controller 170.

The in-vehicle payment system 100 transmits the payment means information to the payment terminal 200 when the payer authentication is successful. The body controller 170 transmits the payment means information via the UWB communication.

The payment terminal 200 performs the payment approval processing using the payment means information (S220). In this connection, the payment terminal 200 performs the payment approval processing after completion of the refueling. The payment terminal 200 transmits a payment approval request message including the payment means information to a payment gateway (PG) company server (not shown). The payment terminal 200 receives a payment approval response from the PG company server.

The payment terminal 200 transmits the payment approval result to the in-vehicle payment system 100 (S230). The payment terminal 200 transmits the payment approval result to the vehicle based on the received payment approval response.

The in-vehicle payment system 100 outputs the payment approval result on the user interface 150 such that the payer may identify the payment approval result (S240). The body controller 170 may display the payment approval result on the display.

Figure 5:
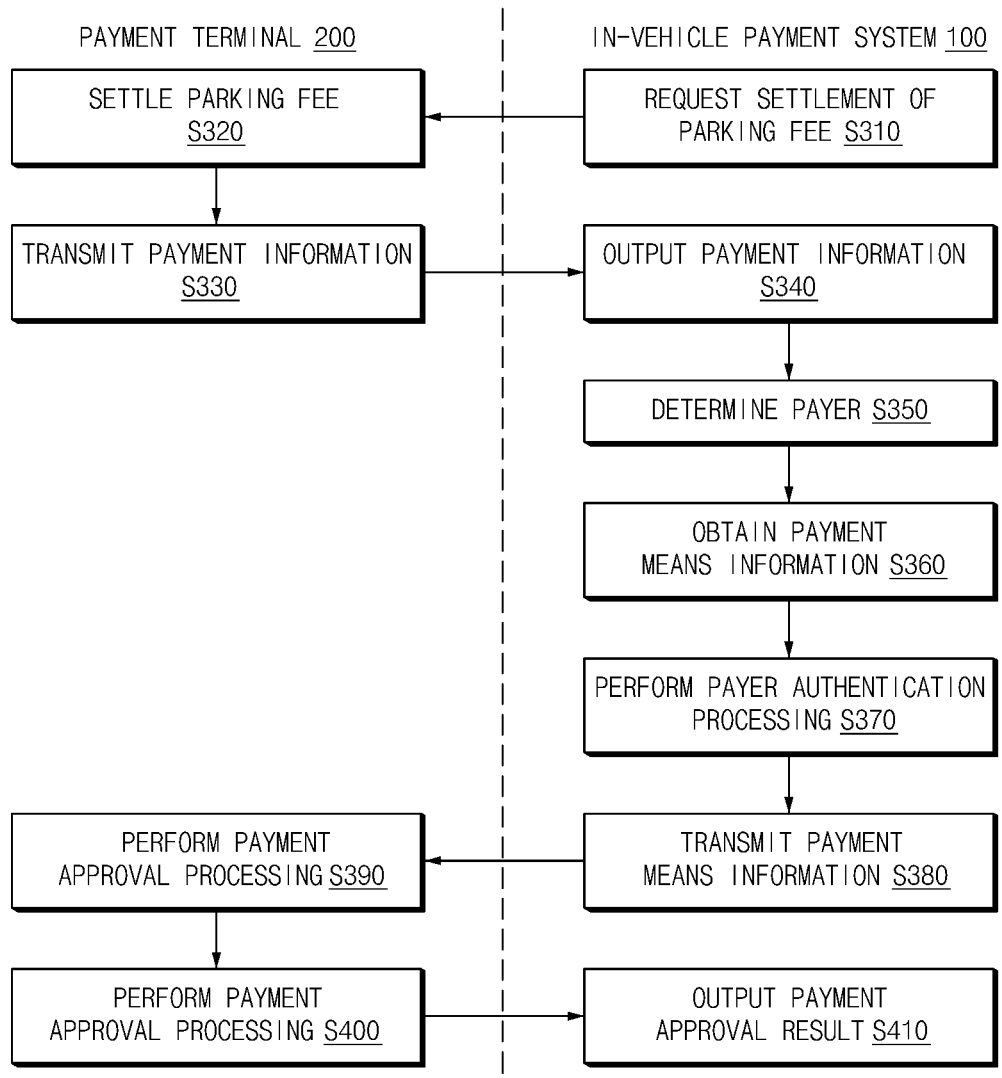
FIG. 5 is a flowchart illustrating an in-vehicle payment method in a second form of the present disclosure.

FIG. 5 is a flowchart illustrating an in-vehicle payment method in some forms of the present disclosure. In some forms of the present disclosure, a case of payment of parking fee will be described as an example. The in-vehicle payment system 100 performs the parking fee payment in association with the payment terminal 200 based on the UWB communication.

The in-vehicle payment system 100 may request settlement of the parking fee (S310). The body controller 170 may request the payment terminal 200 to settle the parking fee before leaving or while leaving a parking lot. When requesting the parking fee settlement, the body controller 170 transmits identification information, such as a vehicle number and/or a parking position, and the like, together.

The payment terminal 200 settles the parking fee based on the request of the in-vehicle payment system 100 (S320). The payment terminal 200 settles the parking fee based on a parking time, with reference to a parking fee table.

The payment terminal 200 generates payment information including the settled parking fee, and transmits the generated payment information to a corresponding vehicle requested the parking fee settlement (S330).

When the payment information is received from the payment terminal 200, the in-vehicle payment system 100 outputs the corresponding payment information (S340). The body controller 170 displays the payment information on the display screen of the user interface 150.

The in-vehicle payment system 100 determines the payer after outputting the payment information (S350).

The in-vehicle payment system 100 obtains the payment means information of the payer when the payer is determined (S360). The body controller 170 of the in-vehicle payment system 100 may obtain the payment means information from the payment device 140 or the mobile terminal 300 matching the determined payer.

The in-vehicle payment system 100 processes the payer authentication for the payment means information (S370).

The in-vehicle payment system 100 transmits the payment means information to the payment terminal 200 when the payer authentication is successful (S380).

The payment terminal 200 performs the payment approval processing based on the payment means information (S390). The payment terminal 200 may request the payment approval to the PG company server after the vehicle leaves the parking lot or when the vehicle starts to leave the parking position (parking spot).

The payment terminal 200 transmits the payment approval result to the in-vehicle payment system 100

(S400). The in-vehicle payment system 100 receives the payment approval result through the first communication device 110.

The in-vehicle payment system 100 outputs the payment approval result to the user interface 150 (S410). The body controller 170 may receive the payment approval result through the first communication device 110 and output the received payment approval result in the form of the visual information and/or the auditory information, and the like.

Figure 6:
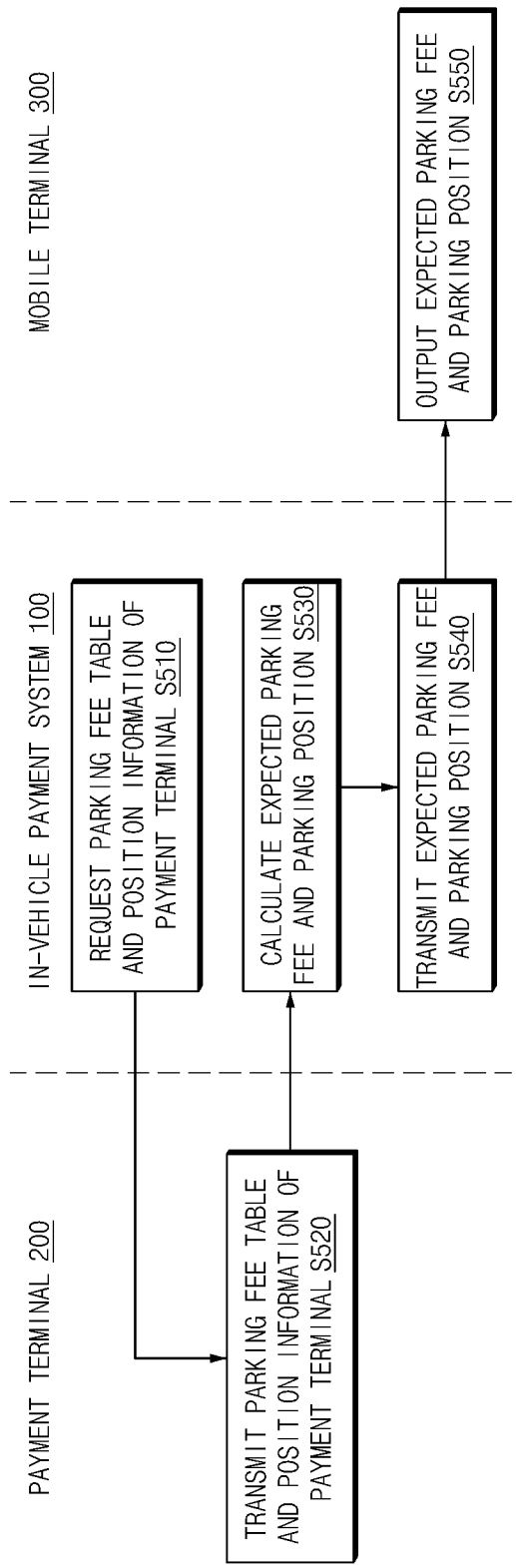
FIG. 6 is a flowchart illustrating a parking fee notification service method in one form of the present disclosure.

FIG. 6 is a flowchart illustrating a parking fee notification service method in some forms of the present disclosure.

Referring to FIG. 6, the in-vehicle payment system 100 requests the payment terminal 200 for the parking fee table and the position information of the payment terminal 200 after the parking is completed (S510). At this time, the body controller 170 may transmit the vehicle information including the vehicle identification information, vehicle model, and the like together. The parking fee table is a table in which a parking fee for each vehicle type and parking time is defined.

The payment terminal 200 transmits the parking fee table and the absolute position information of the payment terminal 200 to the in-vehicle payment system 100 based on the request of the in-vehicle payment system 100 (S520). The payment terminal 200 may transmit parking lot entry time information of the vehicle together.

The in-vehicle payment system 100 calculates the expected parking fee and the parking position based on the parking fee table and the absolute position information (S530). The body controller 170 calculates the expected parking fee based on the parking fee table. The body controller 170 measures the distance between the vehicle and the payment terminal 200 via the UWB communication with the payment terminal 200, and calculates the parking position of the vehicle based on the measured distance.

The in-vehicle payment system 100 transmits the calculated expected parking fee and the parking position to the mobile terminal 300 matching the vehicle (S540). The body controller 170 transmits the expected parking fee and the parking position to the mobile terminal 300 using wireless communication (e.g., telematics) for the vehicle.

The mobile terminal 300 outputs the received expected parking fee and the parking position such that the user may recognize the expected parking fee and the parking position (S550). For example, the mobile terminal 300 displays the expected parking fee and the parking position on the display.

Figure 7:
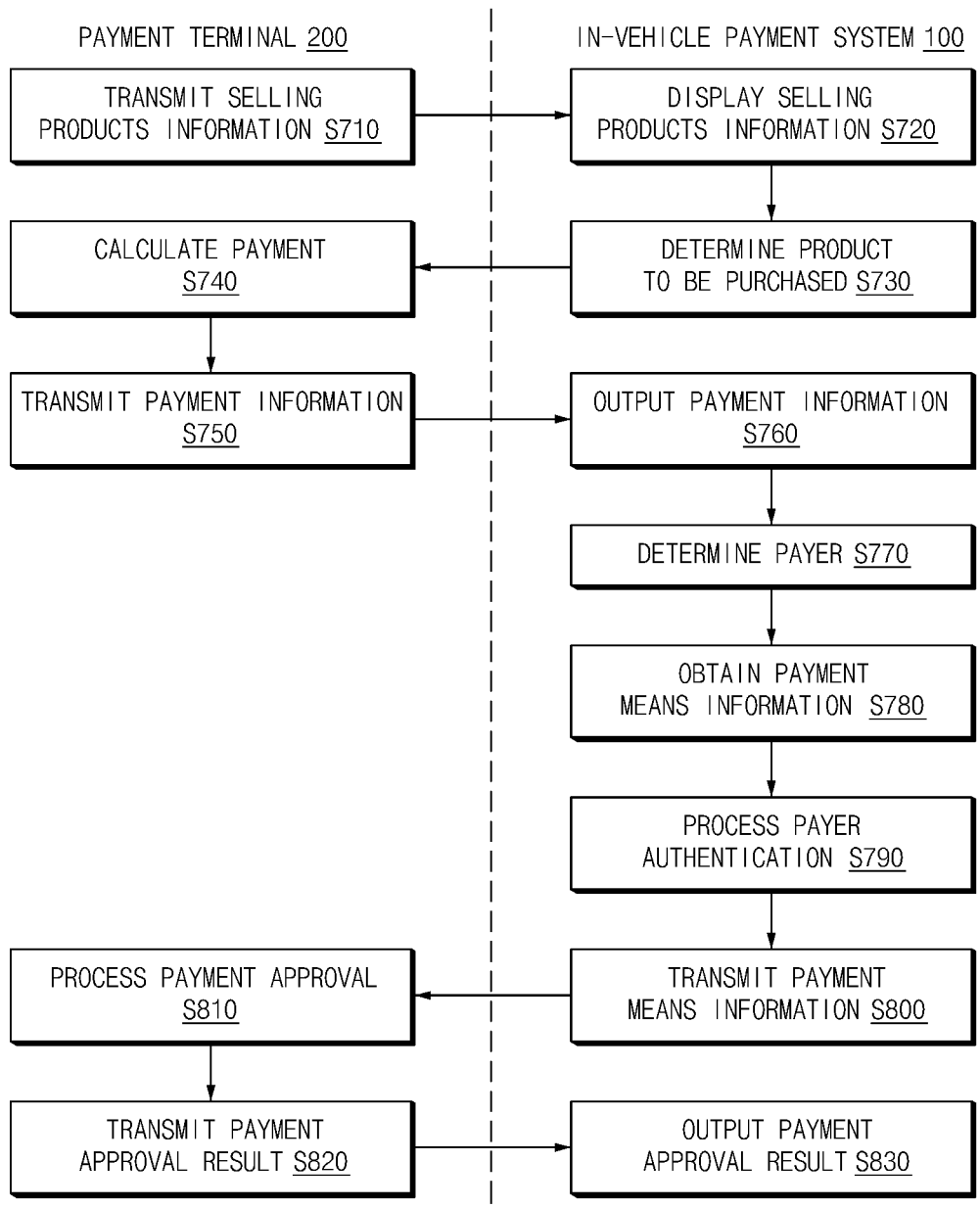
FIG. 7 is a flowchart illustrating an in-vehicle payment method in a third form of the present disclosure.

FIG. 7 is a flowchart illustrating an in-vehicle payment method in some forms of the present disclosure. In some forms of the present disclosure, a case of ordering and paying in a drive-through store will be described as an example.

Referring to FIG. 7, the payment terminal 200 transmits selling products information (S710). The payment terminal 200 transmits the selling products information at a predetermined cycle or transmits the selling products information when the vehicle enters a range of capable of the UWB communication of the payment terminal 200.

The in-vehicle payment system 100 displays the selling products information received from the payment terminal 200 on the screen of the user interface 150 (S720).

The in-vehicle payment system 100 determines a product to be purchased based on the user input received from the user interface 150 (S730). For example, when the driver selects the product to be purchased from among the selling products displayed on the screen of the user interface 150, the body controller 170 determines the product selected by the user as the product to be purchased. The body controller 170 transmits an order sheet containing the determined product to be purchased to the payment terminal 200 when the product to be purchased is determined.

When receiving the order sheet from the in-vehicle payment system 100, the payment terminal 200 calculates a payment based on the product to be purchased in the order sheet (S740).

The payment terminal 200 transmits payment information including the payment to the in-vehicle payment system 100 (S750).

The in-vehicle payment system 100 receives the payment information and outputs the payment information to the user interface 150 (S760).

The in-vehicle payment system 100 determines the payer after outputting the payment information (S770).

When the payer is determined, the in-vehicle payment system 100 obtains the payment means information mapped to the payer (S780). The body controller 170 of the in-vehicle payment system 100 may obtain the payment means information from the payment device 140 or the mobile terminal 300.

The in-vehicle payment system 100 processes the payer authentication to verify the validity of the payment means information (S790). When the payer authentication is successful, the in-vehicle payment system 100 transmits the payment means information to the payment terminal 200 (S800).

The payment terminal 200 processes the payment approval based on the payment means information (S810). The payment terminal 200 may request the payment approval to the PG company server before or after the vehicle reaches a position for receiving the purchased item. The payment terminal 200 receives the payment approval response from the PG company server.

The payment terminal 200 transmits the payment approval result to the in-vehicle payment system 100 (S820). The payment terminal 200 provides the payment approval result to the vehicle based on the payment approval response.

The in-vehicle payment system 100 receives the payment approval result and outputs the payment approval result to the user interface 150 (S830).

Figure 8:
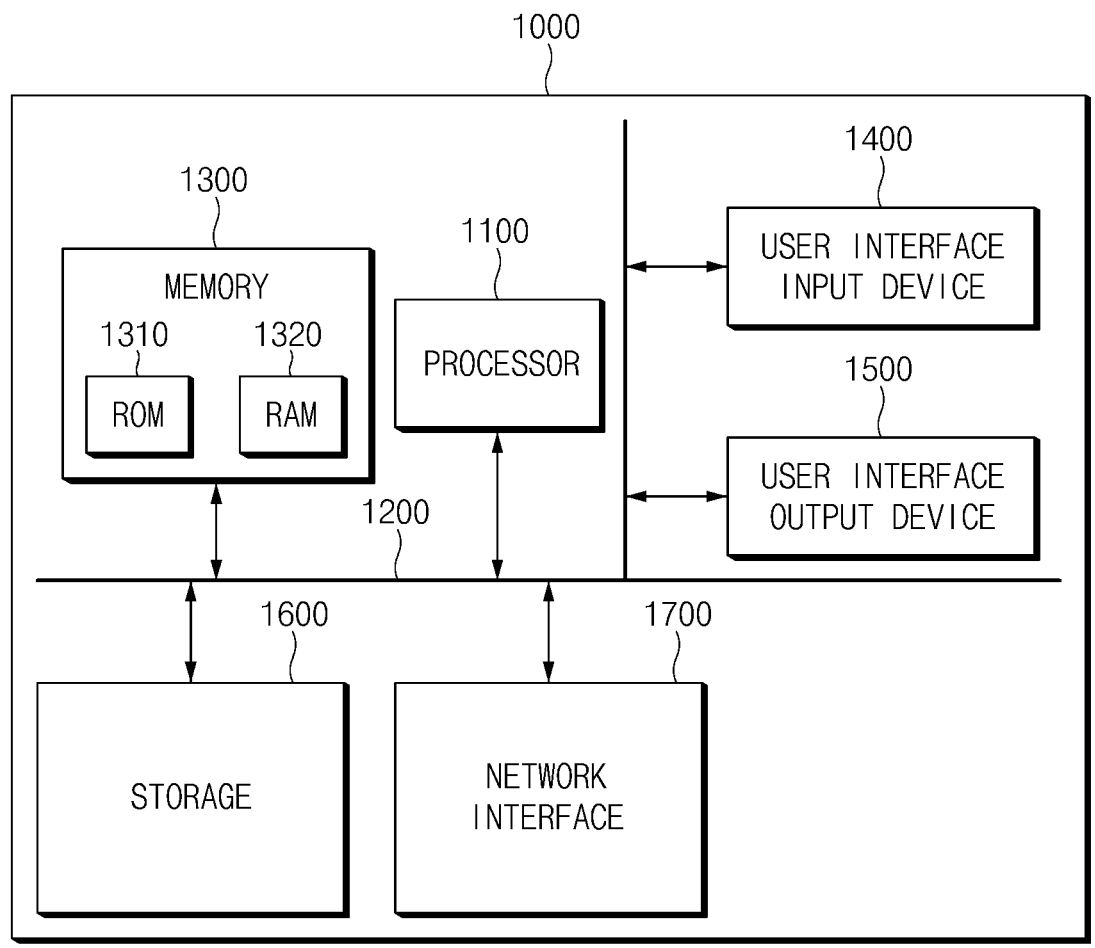
FIG. 8 is a block diagram illustrating a computing system executing an in-vehicle payment method in one form of the present disclosure.

FIG. 8 is a block diagram illustrating a computing system executing an in-vehicle payment method in some forms of the present disclosure.

Referring to FIG. 8, a computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, some forms of the present disclosure are not intended to limit the technical idea of the present disclosure but to illustrate the present disclosure, and the scope of the technical idea of the present disclosure is not limited by some forms of the present disclosure. The scope of the present disclosure should be construed as being covered by the scope of the appended claims, and all technical ideas falling within the scope of the claims should be construed as being included in the scope of the present disclosure.

According to the present disclosure, the payment is performed using the UWB communication, which is used as an authentication security technology of the digital key for the getting on/off of the vehicle, the start-up, and the like, so that security and safety of the in-vehicle payment service may be improved.

In addition, according to the present disclosure, the position of the vehicle performing the payment may be measured based on the UWB communication, so that pre-ordering and remote payment may be available with a single payment terminal.

In addition, according to the present disclosure, the vehicle payment service may be implemented without changing a configuration of the existing digital key system, so that the vehicle payment service may be provided without a cost increase.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An in-vehicle payment system comprising:
   a first communication device configured to communicate with a payment terminal;
   a payment device configured to provide payment form information; and
   a body controller configured to, when receiving payment information from the payment terminal, perform payment processing in association with the payment terminal using the payment form information,
   wherein the body controller is further configured to:
      measure a vehicle position using the first communication device; and
      output the payment information to a user interface based on the vehicle position,
      wherein the body controller is further configured to perform advance payment processing in association with the payment terminal using the payment form information when an error between the vehicle position and a predetermined position is out of a tolerance range and within a secure communication available range, and
      wherein the predetermined position is one of a refueling available position, a parking available position, or a position for receiving an ordered item.

2. The in-vehicle payment system of claim 1, wherein the first communication device is configured to communicate with an ultra wide band (UWB) communication.

3. The in-vehicle payment system of claim 2, wherein the first communication device is configured to communicate with at least one of Bluetooth, near field communication (NFC), or low frequency (LF) communication.

4. The in-vehicle payment system of claim 1, wherein the body controller is further configured to:
   output the payment information to the user interface when the error between the vehicle position and the predetermined position is within the tolerance range.

5. The in-vehicle payment system of claim 1, wherein the system further comprises:
   a second communication device configured to communicate with a mobile terminal via a wireless communication.

6. The in-vehicle payment system of claim 5, wherein the body controller is further configured to obtain the payment form information from the mobile terminal via the second communication device.

7. The in-vehicle payment system of claim 1, wherein the body controller is further configured to perform the payment processing at a time point when at least one of refueling completion, leaving of a parking lot, or receiving the ordered item is satisfied.

8. The in-vehicle payment system of claim 1, wherein the body controller is further configured to:
   receive a parking fee table and absolute position information of the payment terminal from the payment terminal; and
   calculate an expected parking fee and a parking position.

9. The in-vehicle payment system of claim 8, wherein the body controller is further configured to transmit the expected parking fee and the parking position to a mobile terminal matching the vehicle.

10. An in-vehicle payment method, the method comprising:
    receiving, by a body controller, payment information from a payment terminal based on a secure communication;
    obtaining, by the body controller, payment form information;
    measuring, by the body controller, a vehicle position via the secure communication;
    outputting the payment information to a user interface based on the vehicle position; and
    performing, by the body controller, payment processing using the payment form information in association with the payment terminal,
    when an error between the vehicle position and a predetermined position is out of a tolerance range and within a secure communication available range, performing, by the body controller, advance payment processing in association with the payment terminal using the payment form information, and
    wherein the predetermined position is one of a refueling available position, a parking available position, or a position for receiving an ordered item.

11. The method of claim 10, wherein the secure communication is an ultra wide band (UWB) communication.

12. The method of claim 10, wherein the outputting the payment information comprises:
    outputting the payment information to the user interface when the error between the vehicle position and the predetermined position is within the tolerance range.

13. The method of claim 10, wherein the obtaining the payment form information comprises:
    obtaining the payment form information from a payment device mounted in a vehicle or a mobile terminal of a passenger in the vehicle.

14. The method of claim 10, wherein the performing the payment processing comprises:
    performing the payment processing at a time point when at least one of refueling completion, leaving of a parking lot, or receiving the ordered item is satisfied.

* * * * *